United States Patent
Ji et al.

(10) Patent No.: US 9,571,218 B2
(45) Date of Patent: Feb. 14, 2017

(54) POWER EFFICIENT SUBCARRIER AGGREGATOR AND SUBCARRIER COMBINER FOR MULTI-DIRECTION VARIABLE OPTICAL TRANSCEIVER

(71) Applicant: NEC Laboratories America, Inc., Princeton, NJ (US)

(72) Inventors: Philip Ji, Cranbury, NJ (US); Ting Wang, West Windsor, NJ (US)

(73) Assignee: NEC CORPORATION (JP)

( * ) Notice: Subject to any disclaimer, the term of this patent is extended or adjusted under 35 U.S.C. 154(b) by 166 days.

(21) Appl. No.: 14/534,312

(22) Filed: Nov. 6, 2014

(65) Prior Publication Data
US 2015/0125152 A1 May 7, 2015

Related U.S. Application Data

(60) Provisional application No. 61/900,460, filed on Nov. 6, 2013.

(51) Int. Cl.
*H04B 10/00* (2013.01)
*H04J 14/02* (2006.01)
*H04B 10/556* (2013.01)

(52) U.S. Cl.
CPC .......... *H04J 14/02* (2013.01); *H04B 10/5561* (2013.01)

(58) Field of Classification Search
CPC ....... H04B 10/40; H04B 10/43; H04B 10/503; H04B 10/505; H04B 10/508; H04B 10/5561; H04J 14/00; H04J 14/02
USPC ......................................................... 398/135
See application file for complete search history.

(56) References Cited

U.S. PATENT DOCUMENTS

| | | | |
|---|---|---|---|
| 5,455,703 A * | 10/1995 | Duncan | H04B 10/40 375/219 |
| 2013/0236192 A1 * | 9/2013 | Deicke | G06F 1/1632 398/135 |
| 2014/0205286 A1 | 7/2014 | Ji et al. | |

OTHER PUBLICATIONS

Harrick, N. "A Continuously Variable Optical Beam Splitter and Intensity Controller" Applied Optics, vol. 2, Issue 11. 1963 (2 Pages).
Huang, Y. et al., "High-Capacity Fiber Field Trial Using Terabit/s All-Optical OFDM Superchannels With DP-QPSK and DP-8QAM/DP-QPSK Modulation," Journal of Lightwave Technology, Vol. 31, No. 4, Feb. 15, 2013. (pp. 546-553).
Huang, Y. et al., "Terabit/s Optical Superchannel with Flexible Modulation Format for Dynamic Distance/Route Transmission" OFC/NFOEC Technical Digest. 2012. (3 Pages).
Liu, L. et al., "First Proof-of-Concept Demonstration of OpenFlow-Controlled Elastic Optical Networks Employing Flexible Transmitter/Receiver" Proceedings of PS 2012. (3 Pages).

(Continued)

*Primary Examiner* — M. R. Sedighian
(74) *Attorney, Agent, or Firm* — Joseph Kolodka (57) ABSTRACT

A multi direction variable transceiver including a transmitter comprising a subcarrier aggregator including at least one variable transmitter splitter and at least one variable transmitter coupler. The transceiver typically includes a receiver having at least one variable receiver splitter and at least one variable receiver coupler. In some examples, each of the transmitter and the receiver may include a controller for dynamically adjusting a splitting ratio for at least one of the variable receiver splitter, variable receiver coupler, variable transmission splitter and variable transmission coupler.

13 Claims, 5 Drawing Sheets

(56) References Cited

OTHER PUBLICATIONS

Tao, S., et al., "An Optical Power Splitter With Variable Power Splitting Ratio," IEEE Photonics Technology Letters, vol. 23, No. 14, Jul. 15, 2011. (3 Pages).

Way, W.I., et al., "Wavelength contention-free via optical bypass within a colorless and directionless ROADM," Journal of Optical Communications and Networking, vol. 5, No. 10. Oct. 2013. (10 Pages).

Xia, T.J., et al. "Field Experiment with Mixed Line-Rate Transmission (112-Gb/s, 450-Gb/s, and 1.15-Tb/s) over 3,560, km of Installed Fiber Using Filterless Coherent Receiver and EDFAs Only," Optical Fiber Communication Conference and Exposition (OFC/NFOEC), 2011 and the National Fiber Optic Engineers Conference. Mar. 2011. (3 Pages).

Xia, T.J. "10,000-km Enhanced Long-Haul Transmission of 1.15-Tb/s Superchannel using SSMF only," OptoeElectronics and Communications Conference (OECC), Jul. 2011. (pp. 758-759).

Yun, Z., "A 1×2 Variable Optical Power Splitter Development," Journal of Lightwave Technology, vol. 24, No. 3. Mar. 2006. (pp. 1566-1570).

Zheng, L., and Zhu, M., "Variable optical power splitter based on slot waveguide," Proceedings of ACP 2009. (6 Pages).

\* cited by examiner

POWER EFFICIENT SUBCARRIER AGGREGATOR AND SUBCARRIER COMBINER FOR MULTI-DIRECTION VARIABLE OPTICAL TRANSCEIVER

RELATED APPLICATION INFORMATION

This application claims priority to provisional application Ser. No. 61/900,460 filed on Nov. 6, 2013, incorporated herein by reference.

BACKGROUND

Technical Field

The present disclosure relates generally to optical networks, and more particularly, to a multi-direction variable optical transceiver.

Description of the Related Art

The global communication traffic volume is increasing exponentially due to data heavy services, such as high performance internet protocol television (HP-IPTV) and inter data center communications. The traffic patterns are also becoming more dynamic as internet protocol (IP)-based traffic exceeded traditional voice traffic. As a result, the communication backbone network, namely the optical transport network, is facing demands for high capacity and better flexibility.

SUMMARY

In some embodiments, the structures and methods that are disclosed herein provide a subcarrier aggregator and a subcarrier combiner for multi-direction super-channel transceiver that deliver good power efficiency and good signal performance at a reasonable cost.

In one embodiment, the present disclosure provides a transceiver that includes a transmitter comprising a subcarrier aggregator including at least one variable transmitter splitter and at least one variable transmitter coupler. The transceiver may also include a receiver including a subcarrier combiner that includes at least one variable receiver splitter and at least one variable receiver coupler. Each of the transmitter and the receiver may include a controller for dynamically adjusting a splitting ratio for at least one of the variable receiver splitter, the variable receiver coupler, the variable transmission splitter and the variable transmission coupler.

In some embodiments, the present disclosure provides a subcarrier aggregator of a transmitter that may include an array of variable splitters interconnecting with multiple input ends and multiple output ends of the subcarrier aggregator. The subcarrier aggregator may also include a controller that dynamically adjusts the splitting ratio of the variable splitters in the array of variable splitters so that each variable splitter receiving a signal at an input end of the subcarrier aggregator only sends a ratio of the signal to at least one output of the multiple output ends of the subcarrier aggregator that requires the signal set by the controller.

In some embodiments, the present disclosure provides a subcarrier combiner of a receiver that includes a variable splitter interconnecting with a plurality input ends and a plurality of output ends of the subcarrier combiner. The subcarrier combiner of the receiver may also include a controller that dynamically adjusts the splitting ratio of the variable splitters so that the variable splitter is configured to receive signal from only inputs of the plurality of inputs that contain a subcarrier for the receiver.

In yet another aspect of the present disclosure, a method of splitting optical signals in a multichannel transceiver is provided that includes providing a multichannel transceiver including at least one of a subcarrier aggregator or a subcarrier combiner that includes an array of variable splitters, and dynamically adjusting the splitting ratio of variable splitters within the array of variable splitters. The splitting ratio of the variable splitters provides that signal is only transmitted from inputs to the multichannel transceiver to outputs from the multichannel transceiver where the signal is actually required by a controller. This provides that any unnecessary signal is not received by inputs and not transmitted to outputs of the multichannel transceiver to reduce power loss of the signal as it is transmitted through the multichannel transceiver.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to a multi-casting switch (MCS) with variable splitters (VS) to perform subcarrier aggregation and distribution around multiple outputs used in communication networks. In some embodiments, the methods, structures and computers products provided herein provide a subcarrier aggregator and a subcarrier combiner for a multi-direction variable superchannel transceiver that deliver improved power efficiency and signal performance at a reasonable cost.

Global communication traffic volume is increasing exponentially due to data-heavy services such as HD-IPTV and inter-data center communications. The traffic patterns are also becoming more dynamic as IP-based traffic exceeded traditional voice traffic. To meet the capacity demand and flexability for handling traffic volume in communications, multi-directional variable super-channel transceiver have been developed. Unlike conventional transceiver, which has only one output port and one input port each multi-direction transceiver has multiple output ports (and multiple input ports). This can increases the capability and utilization of the super-channel transceiver hardware. For example, if the super-channel transceiver is capable of transmitting/receiving ten subcarriers at 100 Gb/s rate each (1 Tb/s total), and if the current traffic volume is only 600 Gb/s for the particular demand, the remaining 400 Gb/s processing capacity can be used for a different traffic demand that might travel to different route (also called "degree"). Having more than one output allows both these two traffic requests to be processed simultaneously within a single transceiver. Without such multiple-output features, two transceivers will be required to handle two traffic requests going to different directions.

Due to the dynamic nature of the traffic, the data volume and route of each traffic demand varies over time. In some embodiments, the optical system also needs to provide flexibility so that all traffic requests can be met while having good resource efficiency (e.g. utilization rate of the hardware capacity, the assignment of wavelength spectrum). In some embodiments, to meet this flexibility demand, a super-channel transceiver has been designed to allow reconfiguration of various parameters, besides the regular configurable parameters, such as center wavelength/frequency and power level. For example, (1) the number of subcarriers can be adjusted according to the capacity requirement and bandwidth availability; (2) the spacing between adjacent subcarriers can also be tuned dynamically; (3) the modulation format, multiplexing scheme, digital signal processing (DSP) technology, FEC (forward error correction) coding, etc., in each subcarrier can be adjusted, especially when digital transmitter is used (i.e. generate the signal electronically using DSP, convert the digital signal to analog signal, and then modulate onto an optical signal); and (4) the data rate or symbol rate (also called the baud rate) of each subcarrier can be adjusted. The super-channel transceivers may also be referred to as variable super-channel transceivers.

Figure 1:
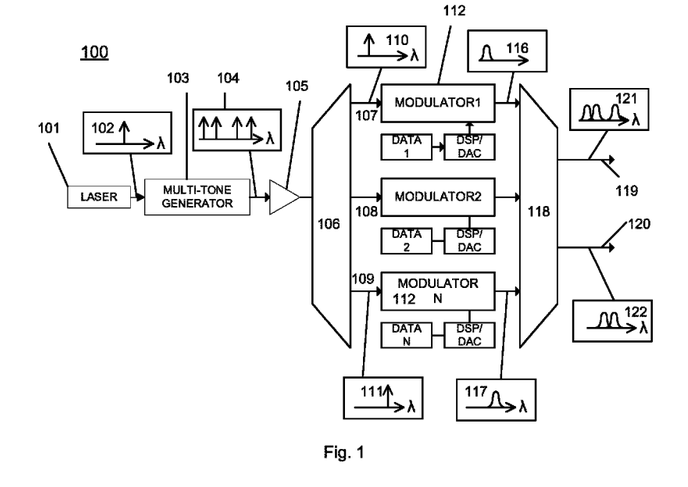
FIG. 1 is a schematic of a multi-direction super-channel transmitter, in accordance with one embodiment of the present disclosure.
Figure 2:
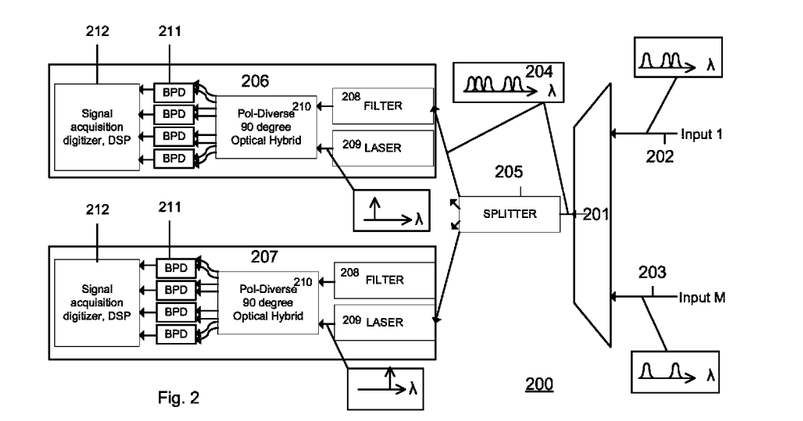
FIG. 2 is a schematic of a multi-direction super-channel receiver, in accordance with one embodiment of the present disclosure.

FIGS. 1 and 2 are schematics of a multi-direction super-channel transmitter and receiver, respectively. Together they form a superchannel transceiver. The multi-direction transmitter used in the upper channel transceiver may use a subcarrier aggregator to distribute multiple subcarriers to multiple outputs.

FIG. 1 depicts one embodiment of a multi-direction variable optical transmitter based on super-channel technology. In this illustration, super-channel transmitter with single light source is used. The source laser 101 outputs a continuous wave (CW) laser light 102, which is usually tunable. The laser output goes through a multi-tone generator 103 to generate multiple tones 104. This multi-tone generator can be constructed using modulators or slow light laser. One or multiple optical amplifiers 105 can be used in various locations of the optical path to boost the signal power. The multiple optical tones are demultiplexed into individual outputs 107, 108, 109 through a subcarrier demultiplexer 106, each containing one different subcarrier identified by reference numbers 110 and 111. Each of these subcarrier can modulated individually by a modulator 112, which applies the data 113 onto the optical subcarrier. For an analog transmitter, the modulation format can be adjusted by reconfiguring the modulator setup (such as turning on and off individual modulation stages to switch among BPSK, QPSK, 8PSK modulation formats). For digital transmitter, which is the likely technology for variable transmitter, the data 113 is processed by a digital signal processor (DSP) 114, which sets the modulation format and applies advanced processing (e.g. digital Nyquist filtering, impairment pre-compensation, etc.), then converted from digital format to analog format by a digital analog converter (DAC) 114 and applies to the modulator 112. Even though only one arrow is shown, e.g. 115, usually there are multiple data streams are fed onto each modulator 112, since multiple modulation dimensions can be utilized simultaneously (such as phase, amplitude, and polarization, etc. . . . ). The modulation signals 116, 117 are sent to a subcarrier aggregator 118, which consists of N inputs and M outputs. The subcarrier aggregator 118 function is to direct each modulated subcarrier to respective output ports, and to combine multiple subcarriers at each output port.

The subcarrier aggregator 118 includes a multicasting switch with variable splitters (VS-MCS) to perform the subcarrier aggregation and distribution among multiple outputs. The controller for the variable super-channel transponder uses a flexible device to send the subcarrier to only the appropriate output(s), and thus avoid the power waste by broadcasting to every output. The multicasting switch with variable splitters (VS-MCS) also features multi-casting and high output count. The subcarrier aggregator 118 including the multicasting switch with variable splitters (VS-MCS) also does not suffer from filtering effects, because they do not require combining the modulated subcarriers first and then separating them. In some embodiments, the subcarrier aggregator 118 that includes the multicasting switch with variable splitters (VS-MCS) of the present disclosure does not contain any filtering element, and is not wavelength-specific. The multicasting switch with variable splitters (VS-MCS) is a single integrated device and does not require two multiplexer-WSS sets.

In some embodiments, after passing through the subcarrier aggregator 118, each output port, e.g. 119 and 120, will have super-channel signal with different subcarrier arrangements, e.g. 121 and 122. These different outputs are sent to different directions in the WDM network. In some embodiments of the variable optical transmitter, not only the number of subcarriers and the configuration in each subcarrier (e.g., modulation format, DSP processing, etc.) can be changed, the output of each subcarrier can also be changed. The subcarrier aggregator 118 and multicasting switch with variable splitters (VS-MCS) is described in more detail with reference to FIGS. 3-5.

Figure 3:
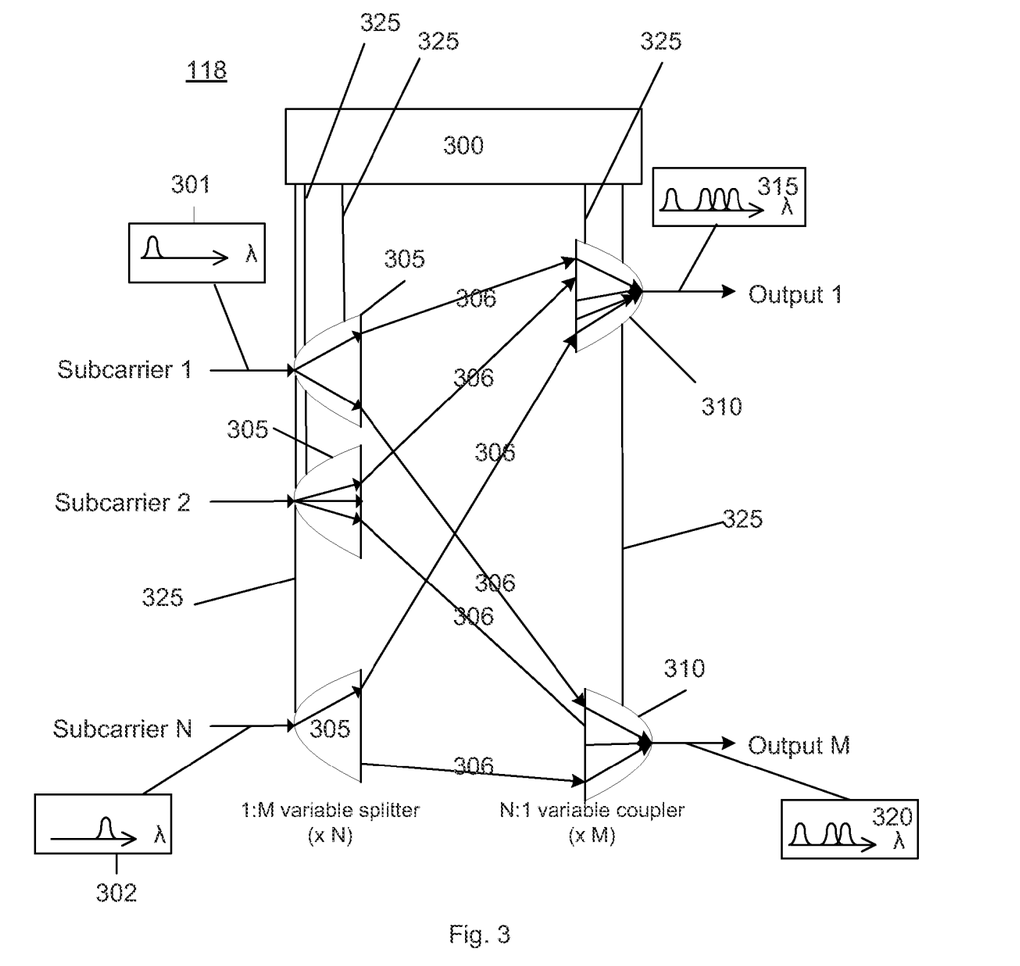
FIG. 3 is a schematic of a subcarrier aggregator using variable splitters, in accordance with one embodiment of the present disclosure.

FIG. 3 depicts one embodiment of a subcarrier aggregator 118 that includes the multicasting switch with variable splitters (VS-MCS) to perform the subcarrier aggregation and distribution among multiple outputs. The controller 300 for the variable super-channel transponder uses this flexible device to send the subcarrier to only the appropriate output(s), and thus avoid the power waste by broadcasting to every output. The subcarrier aggregator 118 that includes the multicasting switch with variable splitters (VS-MCS) also offers other features such as multicasting and high output count. The subcarrier aggregator 118 that includes the multicasting switch with variable splitters (VS-MCS) does not suffer from filtering effect, because it does not require combining the modulated subcarriers first and then separating them. In fact, in some embodiments, the subcarrier aggregator 118 does not contain any filtering element, and is not wavelength specific. The subcarrier aggregator 118 that includes the multicasting switch with variable splitters (VS-MCS) employs and integrated device, and does not require two multiplexer wavelength select switch (WSS) sets.

In some embodiments, the application for the subcarrier aggregator 118 that includes the multicasting switch with variable splitters (VS-MCS) is an optical super-channel for high capacity wavelength-division multiplexing (WDM) systems with dynamic traffic patterns. In some embodiments, the structures and methods disclosed herein offer energy efficiency by not wasting unnecessary optical power, as well as multicasting capability. The subcarrier aggregator 118 that is disclosed herein also provides the ability to reconfigure on the fly through electrical control. In some embodiments, when employed with a intelligent centralized controller, the variable optical super channel can be flexibly and easily configured to deliver different network arrangements and meet different traffic demands, making it suitable for transport software-defined networking (SDN) applications.

In one embodiment, the proposed subcarrier aggregator 118 is based on a multicasting switch with a variable splitter. The term "splitter" as used herein denotes an optical device used to interconnect three or more optical fibers. A splitter may have a number of characteristics that determine their function and application, including the number of input and output ports, signal attenuation, wavelength selectivity, et al. A passive-optical coupler that uses simple optical lenses with a reflective coating tailored to control the split ratio of the device. Conventionally, an optical splitter is a passive device that split, i.e., broadcast, the incoming optical signal into two or multiple parts, each carrying the same signal, i.e., not wavelength-specific, unlike an optical filter or a wavelength select switch (WSS), but with lower power. In most typical systems, the each output of the splitter may have the same splitting ratio. The splitting ration is the distribution of power among the output fibers of a splitter, which may also be referred to as a coupler, such as 50% at each output in a 1:2 splitter or 33% at each output in a 1:3 splitter. In some systems, an asymmetrical splitting ratio may also be employed, such as, e.g., 70%:30% in a 1:2 splitter, or 50%:20%:30% in a 1:3 splitter. Typically, the splitting leads to insertion loss of the signal, such as 3 dB loss for 50% splitting. Regardless of being equal or asymmetric, in a typical splitter, the splitting ratio is present during manufacturing of the splitter, and can not be changed once the component is made. An optical coupler is similar to the optical splitter. An optical coupler employs the principles of a splitter in the reverse direction. The optical coupler combines two or more optical signals into a single output. Similar insertion loss is experienced in a typical optical coupler, as experienced in an optical splitter. The terms "splitter" and "coupler" may be used interchangeably. Another common device in an optical system is an optical switch. A 1× K optical switch has 1 input and K output. The switch selects an output port among the K outputs, and the input signal will exit only the selected port.

A "1:K variable splitter (VS)" is one that allows the dynamic variation of the splitting ratio among the K outputs, in which K represents the number of outputs of the splitter. In one embodiment, the basic configuration of a 1:K variable splitter (VS) is a 1:2 variable splitter, where the splitting ratio between the 2 output ports can be adjusted dynamically, as illustrated in FIGS. 4A-4D.

Figure 4A:
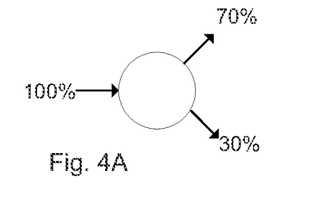
FIGS. 4A-4H are schematic views of splitting rations of a 1:K variable splitter, in accordance with one embodiment of the present disclosure.
Figure 4B:
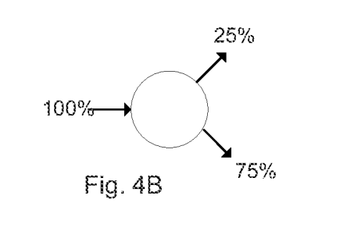
Figure 4C:
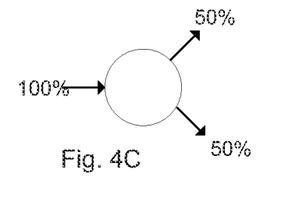
Figure 4D:
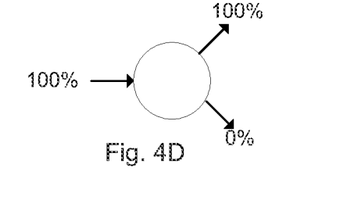

In the examples depicted in FIGS. 4A-4D, the splitting ratios may be symmetric, e.g., 50%:50% (as depicted in FIG. 4C), or asymmetric, e.g., 70%:30% (as depicted in FIG. 4A) or 25%:75% (as depicted in FIG. 4B). In some other examples, as depicted in FIG. 4D, in which the splitting is 100%:0%, all of the signal is sent to one output, making the splitter function in a manner similar to a 1×2 switch.

Figure 4E:
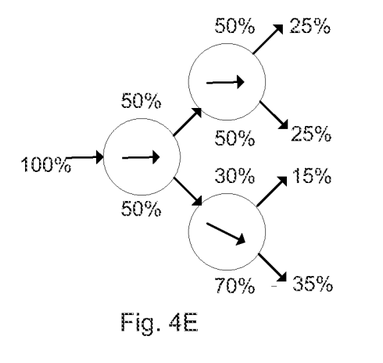
Figure 4F:
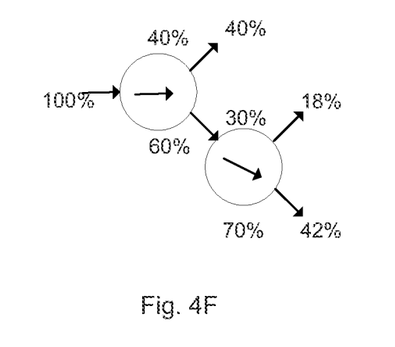
Figure 4G:
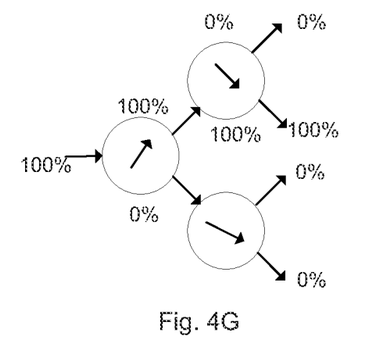

Referring to FIGS. 4E-4F, multiple variable splitters (VS) may be cascaded to form a variable splitter with a higher port count. FIG. 4E depicts one example of adding two 1:2 variable splitters (VS's) to the two output of the first variable splitter (VS). Therefore, the arrangement depicted in FIG. 4E functions as a 1:4 variable splitter (VS). The splitting ratio for each sub-variable splitter (sub-VS) can be adjusted dynamically and independently. Therefore, in some embodiments, the splitting ratio among the four output ports can also be adjusted dynamically. Such cascading can produce a $1:2^P$ variable splitter with $2^P$ output ports, where P is an integer. In some embodiments, when the required output port is not a power of 2, some branch variable splitters (VS) may be removed, such as the embodiment depicted in FIG. 4F. FIG. 4F depicts one example of a 1:3 variable splitter (VS).

Figure 4H:
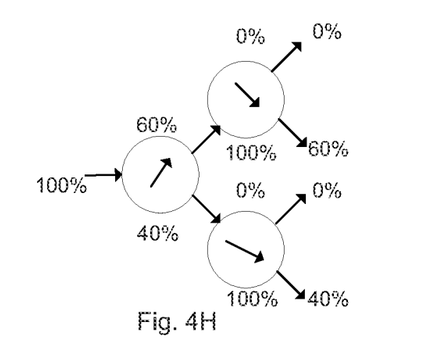

As in the 1:2 variable splitter described above, a 1:K variable splitter (VS) with K outputs can also be configured to function as a 1:K switch, as illustrated in the 1×4 switch example depicted in FIG. 4H, where the input light is multicast to output port 2 and output port 4 with asymmetrical power ratio. Therefore, a 1:K variable splitter can act as 1× K single output switch, or 1× k (k≤K) multicasting switch, or a 1:K regular symmetric splitter, or a 1:K splitter with any splitting ratio. These configurations can be changed dynamically through electronic control.

As used herein, the term "variable" as used to describe an optical splitter, and/or coupler, means that the power ratio of the device may be dynamically changed through electronic control. The total optical power from all output ports equal to the input power (minus the additional loss due to connection interface or manufacturing quality). Such a device can be used in reverse direction to function as K:1 regular optical switch, or a k×1 (k≤K) combiner, or a K:1 regular symmetric coupler, or a K:1 coupler with any coupling ratio. Since they are essentially the same device, the term "variable splitter (VS)" refers to both variable splitter and variable coupler in the remaining of this document.

Variable splitter can be provided by providing an optical splitter using a number of mechanisms, such as variable transmission/reflectance films; employing a variable fiber couple length; employing acousto-optics or electro-optic effects; employing Mach Zehnder effects; and a combination thereof. In some examples, the optic effects that provide a variable splitter and/or variable coupler can employ a type of material, such as $LiNbO_3$ and quartz, which can have an acousto-optic or magnetic optic effect, in which an optical beam propagating through the material causes a change in the material due to acoustic wave, electronic or magnetic field effects. In another example, an optical splitter and/or coupler may employ vanadium dioxide ($VO_2$) to implement an electrically addressable beam splitter with continuously variable splitting ratios. The electrical control of temperature in a thin $VO_2$ layer can be used to vary its transmission/reflection behavior. The technique may be characterized for various incidence angles, s- and p-polarizations, and the wavelength ranges of 400-2000 nm. Splitting ratios that are continuously tunable over four orders of magnitude may be possible using a material similar to vanadium dioxide ($VO_2$).

Additional, examples of mechanisms for provided variable prisms have been disclosed in N. J. Harrick, "A Continuously Variable Optical Beam Splitter and Intensity Controller", Applied Optics, Vol. 2, No. 11, pp. 1203-1204 (1963); Z. Yun, L, Wen, et al., "A 1 2 variable optical power splitter development", Journal of LightwaveTechnology, Vol. 24, No. 3, pp. 1566-1570, 2006; L. Zheng, and M. Zhu, "Variable optical power splitter based on slot waveguide", Proceedings of ACP 2009, ISBN: 978-1-55752-877-3; and S. Tao, B. Yang, et al., "An optical power splitter with variable power splitting ratio", Photonics Technology Letters, Vol. 23, No. 14, pp. 1004-1006, 2011, which are each incorporated herein by reference in their entirety. The above described examples of variable splitters employ sliding prisms; rotating hemi-cylinders; changing the coupling region length of the fiber coupler; changing the refractive index of the two outputs in a Y-junction waveguide; changing polarization state of beam by wave plate rotation; manually adjusting slot waveguides; adjusting applied voltage in an electro-optic interferometer; and changing fiber alignment to a double spot-size mode converter. Among them, some technologies are based on photonic integrated circuits and allow high number of sub-variable splitters (sub-VS) components to be integrated in a compact size and with little additional loss. In some embodiments, the variable splitters disclosed herein are integrated into the multicasting switch (MCS) for subcarrier aggregation applications in a superchannel transceiver.

FIG. 3 depicts the basic schematic of one embodiment of a multicasting switch (MCS) that is based on variable splitters (VS). It has N inputs 301, 302 (one from each modulated subcarrier, i.e., subcarrier 1, subcarrier 2, and subcarrier N) and M outputs (one for each degree/direction). There is one 1:M variable splitter (VS) 305 at each input, and there is one N:1 variable splitter (VS) (acting as variable coupler) 310 at each output. In some embodiments, there are M×N fibers 306 interconnecting the N input variable splitters (VS) 305 and the M output variable splitters (VS) 310.

In some embodiments, photonics integration technologies can be used to integrate all these variable splitter components and optical interconnections together into a single monolithic device or subsystem to reduce the size, additional loss, and interconnecting hardware. Electronic control circuitry 325 for individual variable splitter (VS) components can also be integrated to allow centralized control. At the input, the controller 300 configures each 1:M variable splitter (VS) 305 based on the network planning decision (such as subcarrier assignment, routing selection, etc.), so that this subcarrier's signal is only sent to the variable splitter (VS) output ports that connect to the appropriate outputs.

For example, when the number of outputs is equal to 8, if subcarrier 2's signal needs to be broadcast to Output 3 and Output 5 (out of total 8 outputs), e.g., 315 and 320, the variable splitter (VS) at the Input 2 will be configured to be a 1:2 splitter and only send the signal to its Output 3 and Output 5, therefore each output will have 50% of the original signal (assuming equal splitting is planned). The variable splitter allows for the signal to be selectively sent to where it is needed, i.e., selected outputs.

The above functionality is distinguishable from the conventional multicasting switch (MCS) where a regular, i.e., non-variable, optical splitter is placed at each input, which will split the signal to all outputs regardless of whether the signal is needed for each output. Using the 8 output example that described above, and substituting a non-variable splitter for the variable splitter, the conventional multicasting switch (MCS) with regular, i.e., non-variable, splitter will send 12.5% of signal to each of the 8 outputs, but 6 of them will be wasted, and the correct outputs (Output 3 and Output 5) will only receive ¼ of the signal that is achievable by the new variable splitter multicasting switch (VS-MCS). This is also distinguishable from the conventional multicasting switch (MCS) where a regular optical switch, which is not variable, is placed at each input, which only allows the input signal to go to one output. Using the example above, the conventional MCS with regular switch can only send the signal to either Output 3 or Output 5, and cannot achieve multicasting.

Referring to FIG. 3, at the output, i.e., output 1 and output M, the controller 300 also configures each N:1 variable splitter (VS) 310, i.e., combiner, based on the network planning decision, so that signals from all ports carrying useful signals can be collected, and all the other ports that do not carry useful signal will be ignored. For example, in some embodiments, the network planner decides that subcarriers 1, 4 and 5 will travel to Output 4, then the N:1 variable splitter (VS) 310 at Output 4 will be configured to be a 3:1 coupler, accepting only signals from inputs 1, 4, and 5. The signals from all other inputs will not be received (in fact, the controller already configures the input VS's so that other subcarriers' signals will not be sent this output.) In this case, the 33% of each useful subcarrier's signal will reach the output (assuming equal splitting is planned). This is distinguished from the conventional multicasting switches where regular N:1 optical splitter is placed at each output, where only 1/N of each input signal's power will be received. For example, if there are 12 subcarriers in the system, only 8.3% of the power will be received for each input. This is also different from the conventional MCS where regular optical switch is placed at each output, which only allows up to one subcarrier to be sent to each output, and is not practical for most applications.

Figure 5:
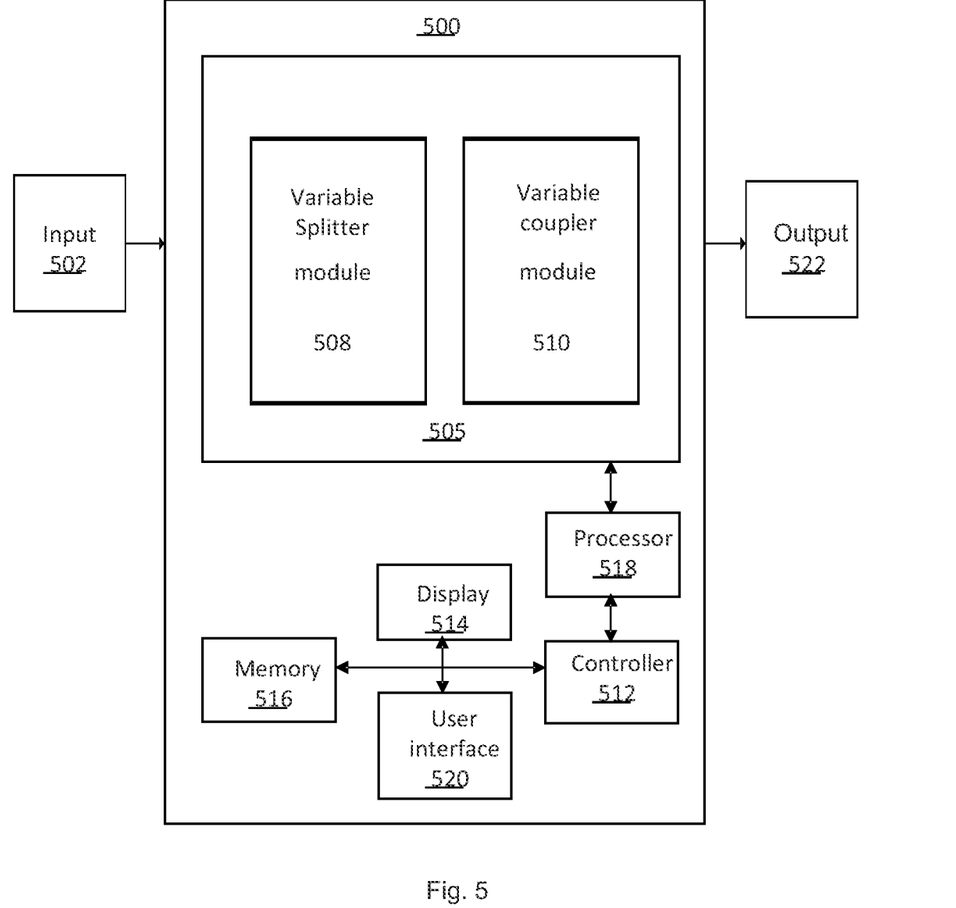
FIG. 5 is a schematic view of an exemplary control system to control the variable optical splitters (VS) disclosed herein, in accordance with the present disclosure.

The controller 300 of the multicasting switch (MCS) including the variable splitters (VS) can be a dedicated controller for the multicasting switch (MCS), or part of the controller for the super-channel transceiver, or part of the controller for the dense wavelength division multiplexing (DWDM) node, or from the centralized controller in the software-defined network (SDN). In one embodiment, the controller 300 may include one or more processors 518 and memory 508, 516 for storing applications, modules and other data, as depicted in FIG. 5. In one example, the one or more processors 518, e.g., hardware processor, and memory 508, 510, 516 may be components of a computer, in which the memory may be random access memory (RAM), a program memory (preferably a writable read-only memory (ROM) such as a flash ROM) or a combination thereof. The computer may also include an input/output (I/O) controller coupled by a CPU bus. The computer may optionally include a hard drive controller, which is coupled to a hard disk and CPU bus. Hard disk may be used for storing application programs, such as some embodiments of the present disclosure, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link.

The controller 300 may be in electrical communication with one or more displays 514 for viewing. The displays 514 may permit a user to interact with the controller 300 and its components and functions. This may be further facilitated by a user interface 520, which may include a mouse, joystick, or any other peripheral or control to permit user interaction with the controller 300 and/or its devices, and may be further facilitated by a controller 512 to the processor 518. It should be understood that the components and functions of the controller 300 may be integrated into one or more systems or workstations. The display 514, a keyboard and a pointing device (mouse) may also be connected to I/O bus of the computer. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

The controller 300 may receive input data 502 which may be employed as input to a plurality of modules 505. The plurality of modules 505 may include a module for adjusting the variable splitter, which may be referred to as the variable splitter module 508. In some embodiments, the variable splitter module 508 may include instructions to execute using a processor adjustment of the splitting ratio of the 1:M variable splitter (×N) 305 depicted in FIG. 3. The plurality of modules 505 may also include a module for adjust the variable coupler, which may be referred to as the variable coupler module 510. In some embodiments, the variable splitter module 508 may include instructions to execute using a processor adjustment of the splitting ratio of the 1:N variable coupler (×M) 310 depicted in FIG. 3.

The controller 300 may produce output data 522, which in one embodiment may be displayed on one or more display devices 514. It should be noted that while the above configuration is illustratively depicted, it is contemplated that other sorts of configurations may also be employed according to the present principles.

In some embodiments, at least one of the variable splitters (VS) and/or variable couplers at either the input end, e.g., variable splitter 305, or the output end, e.g., variable coupler 310, of the subcarrier aggregator 118 can be replaced by conventional optical couplers/splitters or optical switches. This will reduce the hardware cost, however some of the advantages and features will no longer be available. Table 1 is a comparison among different multicasting switch (MCS) configurations. As illustrated in Table 1, the multicasting switch (MCS) employing variable splitters and variable combines is the only one that offers both high power efficiency (up to the possible limit, without any waste) and multicasting capability, and does not have output subcarrier number limitation.

TABLE 1

| INPUT END | OUTPUT END | INSERTION LOSS | MULTICASTING | Max number of subcarriers at each output |
|---|---|---|---|---|
| Non-variable splitter | Switch | High | Yes | 1 |
| Switch | Non-variable Coupler | High | No | All |
| Variable splitter | Variable Coupler | Low | Yes | All |
| Variable splitter | Non-variable Coupler | High | Yes | All |
| Non-variable splitter | Variable Coupler | High | Yes | All |
| Variable splitter | Switch | Low | Yes | 1 |
| Switch | Variable Coupler | Low | No | All |

Referring to FIG. 2, for the receiver end 200 of the multi direction variable super-channel transceiver, a subcarrier combiner 201 is used to combine signals arriving from multiple degrees. For one embodiment of a multi-direction variable optical receiver, as shown in FIG. 2, there are input signals 202, 203 from multiple directions, each carrying different combinations of super-channel subcarriers. With appropriate network control and subcarrier allocation scheme, there will not be subcarrier contention among different inputs. These multiple inputs are combined using a subcarrier combiner 201, which can be an optical coupler, to form a super-channel 204. Depending on the bandwidth of the received super-channel and the receiver hardware, the signal might be split into multiple sections through an optical splitter 205 and be received by individual optical receiver units 206, 207. For example, each of the individual optical receiver units 206, 207 may include filters 208, lasers 209, polarization-diverse 90 degree optical hybrid 210, balanced photodetector (BPD) 211, and signal acquisition, digitizer, and digital signal processor (DSP) devices 212. The "90 degree optical hybrid" is a common optical component to mix the received signal and local oscillator in a coherent optical receiver. One type of "90 degree optical hybrid" is "polarization-diverse 90 degree optical hybrid", which is used for the signals that are polarization-multiplexed (usually the case for high-speed transmission).

For the subcarrier combiner 210, i.e., variable subcarrier combiner, at the super-channel receiver, the design can be simpler than the variable splitter (VS) of the transmission end 100 of the multi direction variable super-channel transceiver. However, the variable splitter (VS) can also improve the power efficiency by eliminating the power waste.

Figure 6:
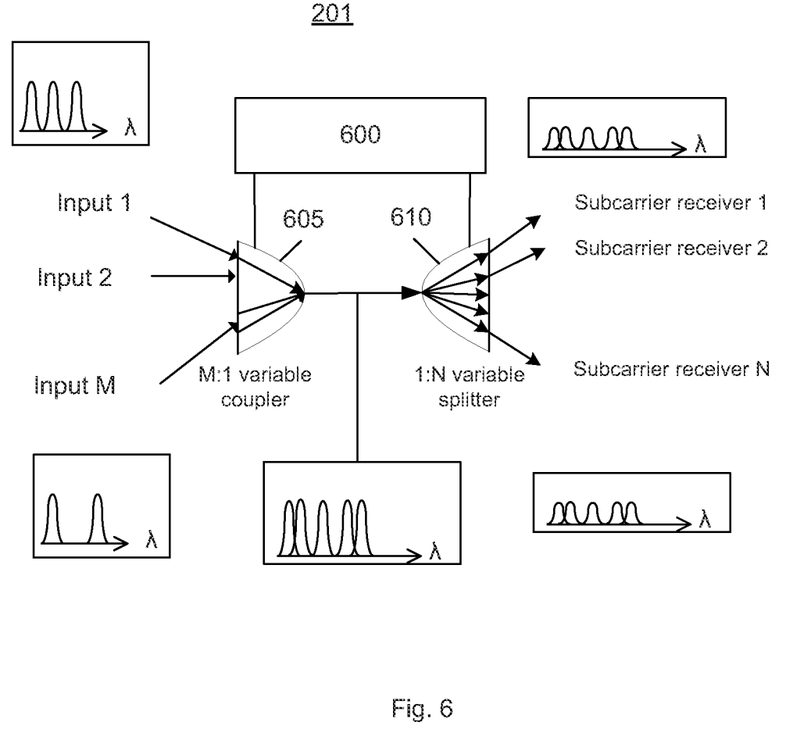
FIG. 6 is a schematic of one embodiment of a subcarrier combiner using variable splitters (VS), in accordance with the present disclosure.

In some embodiments, a variable splitter, i.e., variable coupler, based subcarrier combiner consists of an M:1 variable coupler 605 and 1:N variable splitter 610 connected in series. The devices that provides the M:1 variable coupler 605 and 1:N variable splitter 610 depicted in FIG. 6 are similar to the 1:M variable splitter (VS) 305 and N:1 variable splitter (VS) 310 that have been described above with reference to FIG. 3. For example, a variable splitting ratio may be provided for the structures described with reference to FIG. 6. with optical splitter employing a number of mechanisms, such as variable transmission/reflectance films; employing a variable fiber couple length; employing acousto-optics or electro-optic effects; employing Mach Zehnder effects; and a combination thereof.

The receiver has M inputs from M directions, and each of them can carry up to N subcarriers. The network's planner and controller 600 ensure that there is no contention among the subcarriers, e.g., subcarrier receiver 1, subcarrier receiver 2, and subcarrier receiver N, which means that there are altogether up to N different subcarriers from the M inputs. In other words, each subcarrier will only be contained from 1 input or from none of them.

The network's planner and controller 600 is similar to the controller 300 that has been described above with reference to FIG. 3. For example, similar to the controller 300 depicted in FIG. 5, the network planner and controller 600 that is depicted in FIG. 6 may include at least one of a processor (similar to the processor 518), such as a hardware processor; memory (similar to the memory 516); a user interface (similar to user interface 520); display (similar to displayer 514); and controller to the processor (similar to controller 518).

The planner and controller 600 may also include at a plurality of modules similar to the controller 300 arrangement that is depicted in FIG. 3. For example, the planner and controller 600 may receive input data which may be employed as input to a plurality of modules. The plurality of modules may include a module for adjusting the M:1 variable coupler 605 that is depicted in FIG. 6, in which the module may include instructions to execute using a processor adjustment of the splitting ratio of the M:1 variable coupler 605. The plurality of modules may also include a module for adjust the 1:N variable splitter 620 that is depicted in FIG. 6, which may include instructions to execute using a processor adjustment of the splitting ratio of the 1:N variable splitter 620. The planner and controller 600 may produce output data, which in one embodiment may be displayed on one or more display devices.

In a typical subcarrier combiner, an M:1 fixed coupler is used to combine the signals from different inputs, therefore the power passes through the coupler is at most 1/M. For example, if M=8, then at most ⅛ of the input power will reach the output of the coupler, i.e. there will be at least 9 dB insertion loss. By replacing the conventional M:1 coupler, with an M:1 variable splitter (VS), the loss will be reduced in most cases, since it is not likely that each input will carry some subcarrier(s) for the receiver. Even in such extreme case, the loss of the variable splitter (VS) based solution is the same as the conventional solution. In most cases, the loss can be much lower. Using the above example, if only 3 out of 8 inputs contain subcarriers for the receiver, the variable splitter can be configured to receive signal from these 3 inputs only. Therefore, ⅓ of each input signal will be received, and the insertion loss is about 5 dB.

Similarly, in some embodiments, for the 1:N splitter 610, the variable splitter (VS) ensures that the combined subcarriers will be sent to only the receivers corresponding to those subcarriers with useful data. For example, if the super-channel contains up to 10 subcarriers, but only 6 carriers useful data at the time, instead of splitting the signal power to 10 portions (as in conventional subcarrier combiner), the variable splitter (VS)-based subcarrier combiner only split the power into 6 portions for the 6 designated subcarrier receivers. This reduces the unnecessary power waste.

Combining the power saving from the coupler size and the splitter side, the VS-based subcarrier combiner delivers good power efficiency. Both the variable splitter and variable coupler are configured by a controller, which has the information of which incoming directions contain useful signal, and which subcarriers are used.

In some embodiments, the present disclosure provides a subcarrier aggregator, which contains an array of variable splitters interconnecting with another array of variable couplers. Through the controller, each variable splitter at the input end only sends the signal to the useful output, and each output only receives signals from the inputs that carry useful signal. The configuration can be changed dynamically through the controller and the variable splitters/couplers. Different alternatives have also been provided for the above described designs including variable splitters and variable couples, by changing either end of the variable splitter with conventional non-variable splitter/coupler or switch.

In some embodiments, the present disclosure provides a device having the ability to perform multicasting at the super-channel transmitter through the new subcarrier aggregator.

In some embodiments, the present disclosure provides a subcarrier combiner which contains a variable coupler and a variable splitter in series. Through the controller, the coupler only receives signals from the inputs that carry useful signal, and the splitter only sends the combined signal to the receivers for the used subcarriers. The configuration can be changed dynamically through the controller and the variable splitters/couplers.

In some embodiments, the present disclosure provides a controller that uses the existing network information (e.g. which links contain signal, which subcarriers are used, etc.) to configure the subcarrier aggregator and subcarrier combiner to optimize the power efficiency. An energy efficient variable super-channel transceiver may be provided that uses these subcarrier aggregator and subcarrier combiner.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A transceiver comprising:
    a transmitter comprising a subcarrier aggregator including at least one variable transmitter splitter and at least one variable transmitter coupler; and
    a receiver comprising a subcarrier combiner including at least one variable receiver splitter and at least one variable receiver coupler, wherein each of the transmitter and the receiver may include a controller for dynamically adjusting a splitting ratio for at least one of the variable receiver splitter, the variable receiver coupler, the variable transmission splitter and the variable transmission coupler;
wherein the subcarrier combiner includes a plurality of inputs, and the at least one variable receiver splitter is configured to receive signal from only inputs of the plurality of inputs that contain a subcarrier for the receiver.

2. The transceiver of claim 1, wherein the transceiver includes multiple inputs and multiple outputs.

3. The transceiver of claim 1, wherein the transmitter includes a source laser output that transmits a light signal through a multi-tone generator to generate multiple tones.

4. The transceiver of claim 3, wherein the transmitter further comprises an amplifier to increase signal power after the multi-tone generator produces multiple tones from the light signal.

5. The transceiver of claim 4, wherein the transmitter comprises a subcarrier de-multiplexer that is positioned to receive the multiple tones, the subcarrier de-multiplexer is de-multiplexed into individual outputs, each containing a different subcarrier.

6. The transceiver of claim 5, wherein said subcarrier is modulated individually by a modulator that applies data onto the subcarrier.

7. The transceiver of claim 6, wherein the subcarrier aggregator of the transmitter is configured to direct each modulated subcarrier to a respective output ports, and to combine multiple subcarriers at each output port.

8. The transceiver of claim 1, wherein the subcarrier aggregator configures the splitting ratio of at least one of the variable transmitter splitter and the variable transmitter coupler through electrical control.

9. The transceiver of claim 8, wherein the electrical control of the splitting ratio of at least one of the variable transmitter splitter is actuated by at least one hardware processor of the controller.

10. The transceiver of claim 1, wherein at least one of the variable receiver splitter, the variable receiver coupler, the variable transmission splitter and the variable transmission coupler provide a variable splitting ratio by employing sliding prisms, rotating hemi-cylinders, changing coupling region length of a fiber coupler, changing a refractive index of two outputs in a Y-junction waveguide, changing a polarization state of beam by wave plate rotation, adjusting slot waveguides, adjusting applied voltage in an electro-optic interferometer, and changing fiber alignment to a double spot-size mode converter.

11. A transceiver comprising:
a transmitter comprising a subcarrier aggregator including at least one variable transmitter splitter and at least one variable transmitter coupler; and
a receiver comprising a subcarrier combiner including at least one variable receiver splitter and at least one variable receiver coupler, wherein each of the transmitter and the receiver may include a controller for dynamically adjusting a splitting ratio for at least one of the variable receiver splitter, the variable receiver coupler, the variable transmission splitter and the variable transmission coupler;
wherein the subcarrier combiner includes a plurality of inputs, and the at least one variable receiver splitter is configured to receive signal from only inputs of the plurality of inputs that contain a subcarrier for the receiver
wherein the subcarrier combiner reconfigures the splitting ratio of at least one of the variable receiver splitter through electrical control.

12. The transceiver of claim 11, wherein the electrical control of the splitting ratio of at least one of the variable transmitter splitter is actuated by at least one hardware processor of the controller.

13. The transceiver of claim 11, wherein at least one of the variable receiver splitter, the variable receiver coupler, the variable transmission splitter and the variable transmission coupler provide a variable splitting ratio by employing sliding prisms, rotating hemi-cylinders, changing coupling region length of a fiber coupler, changing a refractive index of two outputs in a Y-junction waveguide, changing a polarization state of beam by wave plate rotation, adjusting slot waveguides, adjusting applied voltage in an electro-optic interferometer, and changing fiber alignment to a double spot-size mode converter.

* * * * *